(12) United States Patent
Lin (10) Patent No.: US 11,212,798 B2
(45) Date of Patent: Dec. 28, 2021

(54) METHOD FOR TRANSMITTING UPLINK INFORMATION, TERMINAL DEVICE AND NETWORK DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/168,671

(22) Filed: Feb. 5, 2021

(65) Prior Publication Data
US 2021/0160864 A1 May 27, 2021

Related U.S. Application Data

(63) Continuation of application No. PCT/CN-2018/099700, filed on Aug. 9, 2018.

(51) Int. Cl.
| | |
|---|---|
| H04W 74/00 | (2009.01) |
| H04W 72/04 | (2009.01) |
| H04W 72/12 | (2009.01) |
| H04W 72/14 | (2009.01) |
| H04L 12/875 | (2013.01) |

(Continued)

(52) U.S. Cl.
CPC ......... H04W 72/0446 (2013.01); H04L 47/56 (2013.01); H04W 72/12 (2013.01);
(Continued)

(58) Field of Classification Search
CPC ... H04W 48/12; H04W 52/14; H04W 72/042; H04W 72/1284; H04W 72/12;
(Continued)

(56) References Cited

U.S. PATENT DOCUMENTS

| | | | |
|---|---|---|---|
| 2018/0124749 A1* | 5/2018 | Park | H04W 74/08 |
| 2018/0317255 A1 | 11/2018 | Um et al. | |
| 2018/0359772 A1* | 12/2018 | Park | H04W 72/1268 |

FOREIGN PATENT DOCUMENTS

| | | |
|---|---|---|
| CN | 107667565 A | 2/2018 |
| CN | 108271435 A | 7/2018 |
| WO | 2018094652 A1 | 5/2018 |

OTHER PUBLICATIONS

R1-1803678, "NR frame structure and scheduling on unlicensed bands", Apr. 16-Apr. 20, 2018 (Year: 2018).*

(Continued)

*Primary Examiner* — Salvador E Rivas
(74) *Attorney, Agent, or Firm* — Perkins Coie LLP (57) ABSTRACT

A method for transmitting information, a terminal device and a network device are provided. The method comprises: a terminal device receives n groups of downlink channels/signals on a downlink resource in the channel occupancy time (COT), each group of downlink channels/signals in the n groups of downlink channels/signals comprising at least one downlink channel/signal; the terminal device transmits uplink information corresponding to an i-th group of downlink channels/signals in the n groups of downlink channels/signals on an uplink resource in the COT; the starting time for transmitting uplink information corresponding to the i-th group of downlink channels/signals is determined according to the end time T0 of the i-th group of downlink channels/signals, the end time T1 of the downlink resource, and a processing delay of the downlink channel/signal.

20 Claims, 4 Drawing Sheets

---

200

210 — The terminal device receives n sets of downlink channel/signals on downlink resources within a channel occupation time (COT), and each set of downlink channel/signals in the n sets of downlink channel/signals includes at least one downlink channel/signal, and n is a positive integer greater than or equal to 1

220 — The terminal device transmits the uplink information corresponding to the i-th set of downlink channel/signals in the n sets of downlink channel/signals on the uplink resources in the COT, where i is a positive integer less than n;
Wherein, the start time for transmitting the uplink information corresponding to the i-th set of downlink channel/signals is based on the end time T0 of the i-th set of downlink channel/signals, the end time T1 of the downlink resource and the processing delay of the downlink channel/signal (51) Int. Cl.
  *H04W 74/08* (2009.01)
  *H04L 1/00* (2006.01)
(52) U.S. Cl.
  CPC ......... *H04W 72/14* (2013.01); *H04W 74/004* (2013.01); *H04W 74/0866* (2013.01); *H04L 1/0018* (2013.01)
(58) Field of Classification Search
  CPC .............. H04W 72/14; H04W 74/004; H04W 74/0866; H04L 1/0018; H04L 47/56
  See application file for complete search history.

(56) References Cited

OTHER PUBLICATIONS

Huawei et al. "NR Frame Structure and Scheduling on Unlicensed Bands, R1-1803678," 3GPP TSG RAN WG1 Meeting #92bis, Apr. 16, 2018(Apr. 16, 2018), sections 1-6, and figures1-5.
International Search Report in the international application No. PCT/CN2018/099700, dated May 8, 2019.
Interdigital Inc: "Discussion on HARO Procedure in NR-Unlicensed", 3GPP DRAFT; R1-1807038, vol. Ran WG1, No. Busan, Korea; May 21, 2018-May 25, 2018 May 20, 2018(May 20, 2018), XP051442236. 3 pages.
Nokia et al.: "HARO enhancements for NR unlicensed", 3GPP Draft; R1-1806110; France vol. Ran WG1, No. Busan, Korea; May 21, 2018-May 25, 2018 May 11, 2018(May 11, 2018), XP051461707. 3 pages.
Supplementary European Search Report in European application No. 18929410.1, dated Jun. 21, 2021. 7 pages.

\* cited by examiner

| 300 | The network device sends n sets of downlink channel/signals to the terminal device on downlink resources within a channel occupation time, COT, and each set of downlink channel/signals in the n sets of downlink channel/signals includes at least one downlink channel/signal, n is a positive integer greater than or equal to 1 | 310 |
|---|---|---|
| | The network device receives the uplink information corresponding to the i-th set of downlink channel/signals in the n sets of downlink channel/signals on the uplink resources in the COT, where i is a positive integer less than n; wherein, the start time for receiving the uplink information corresponding to the i-th set of downlink channel/signals is determined according to the end time T0 of the i-th set of downlink channel/signals, the end time T1 of the downlink resource, and the processing delay of the downlink channel/signal | 320 |

METHOD FOR TRANSMITTING UPLINK INFORMATION, TERMINAL DEVICE AND NETWORK DEVICE

CROSS-REFERENCE TO RELATED APPLICATION

The present disclosure is a continuation application of PCT Application No. PCT/CN2018/099700, filed on Aug. 9, 2018, the entire disclosure of which is hereby incorporated by reference.

TECHNICAL FIELD

The implementations of the application relate to the field of communications, and in particular relate to a method for information transmission, a terminal device and a network device.

BACKGROUND

In the Long Term Evolution (LTE) system, in order to ensure the reliability of uplink information, the corresponding uplink information of the downlink channel/signal transmitted on the unlicensed spectrum is transmitted on the licensed spectrum.

The New Radio (NR) system needs to support independent work, so it needs to support the transmission of uplink information corresponding to the downlink channel/signal on the unlicensed spectrum.

SUMMARY

Implementations of this application provide a method for information transmission, a terminal device, and a network device, which can realize the transmission of uplink information corresponding to the downlink channel/signal within the channel occupation time (COT) on the unlicensed spectrum, and it is conducive to reliable transmission of the uplink information corresponding to the downlink channel/signal.

In the first aspect, a method for information transmission is provided. The method includes: a terminal device receives n sets of downlink channel/signals on downlink resources within a channel occupation time COT, and each set of downlink channel/signals in the n sets of downlink channel/signals set includes at least one downlink channel/signal, and n is a positive integer greater than or equal to 1; the terminal device transmits uplink information corresponding to the i-th set of downlink channel/signals in the n sets of downlink channel/signals on the uplink resources within the COT, and i is a positive integer less than n; wherein, the starting time for transmission of the uplink information corresponding to the i-th set of downlink channel/signals is determined based on the ending time T0 of the i-th set of downlink channel/signals, the ending time T1 of the downlink resource and the processing latency of the downlink channel/signal.

In a second aspect, a method for information transmission is provided. The method includes: a network device sends n sets of downlink channel/signals to a terminal device on downlink resources within a channel occupation time COT, and each set of downlink channel/signals in the n sets of downlink channel/signals includes at least one downlink channel/signal, and n is a positive integer greater than or equal to 1; the network device receives uplink information corresponding to the i-th set of downlink channel/signals in the n sets of downlink channel/signals on the uplink resources within the COT, and i is a positive integer less than n; where the starting time of receiving the uplink information corresponding to the i-th set of downlink channel/signals is determined based on the ending time T0 of the i-th set of downlink channel/signals, the ending time T1 of the downlink resource and the processing latency of the downlink channel/signal.

In the third aspect, a terminal device is configured to perform the method in the above-mentioned first aspect or each of the implementations thereof.

Specifically, the terminal device includes a functional module for performing the method in the above-mentioned first aspect or each of the implementations thereof.

In the fourth aspect, a network device is configured to perform the method in the second aspect or each of the implementation thereof.

Specifically, the network device includes a functional module for performing the method in the above-mentioned second aspect or each of the implementations thereof.

In a fifth aspect, a terminal device is provided, including a processor and a memory. The memory is configured to store a computer program, and the processor is configured to invoke and run the computer program stored in the memory, and perform the method in the above-mentioned first aspect or each of the implementations thereof.

In a sixth aspect, a network device is provided, including a processor and a memory. The memory is configured to store a computer program, and the processor is configured to invoke and run the computer program stored in the memory, and perform the method in the above-mentioned second aspect or each of the implementations thereof.

In a seventh aspect, a chip is provided for implementing any one of the methods in the above-mentioned first aspect, the above-mentioned second aspect, and each of the implementations thereof.

Specifically, the chip includes: a processor, configured to invoke and run a computer program from a memory, so that the device installed with the chip perform s any one of the methods in the above-mentioned first aspect, the above-mentioned second aspect, and each of its implementations thereof.

In an eighth aspect, a computer-readable storage medium is provided. The computer-readable storage medium is configured to store a computer program. The computer program enables the computer to perform any one of the methods in the above-mentioned first aspect, the above-mentioned second aspect and each of the implementations thereof.

In a ninth aspect, a computer program product is provided, including computer program instructions that cause a computer to perform any one of the methods in the above-mentioned first aspect, the above-mentioned second aspect and each of the implementations thereof.

In a tenth aspect, a computer program is provided, which when running in a computer, causes the computer to perform any one of the methods in the above-mentioned first aspect, the above-mentioned second aspect, and each of the implementations thereof.

DETAILED DESCRIPTION

The technical solutions in the implementations of the application will be described below in conjunction with the drawings in the implementations of the application. Obviously, the described implementations are a part of the implementations of the application, rather than all of them. Based on the implementations in the application, all the other implementations obtained by a person skilled in the art without creative work are within the protection scope of this application.

The technical solutions of the implementations of this application can be applied to various communication systems, such as: Global System of Mobile communication (GSM) system, Code Division Multiple Access (CDMA) system, Wideband Code Division Multiple Access (Wideband Code Division Multiple Access, WCDMA) system, General Packet Radio Service (GPRS), LTE system, LTE Frequency Division Duplex (FDD) system, LTE Time Division Duplex (Time Division Duplex, TDD), Universal Mobile Telecommunication System (UMTS), Worldwide Interoperability for Microwave Access (WiMAX) communication system or 5G system, etc.

Figure 1:
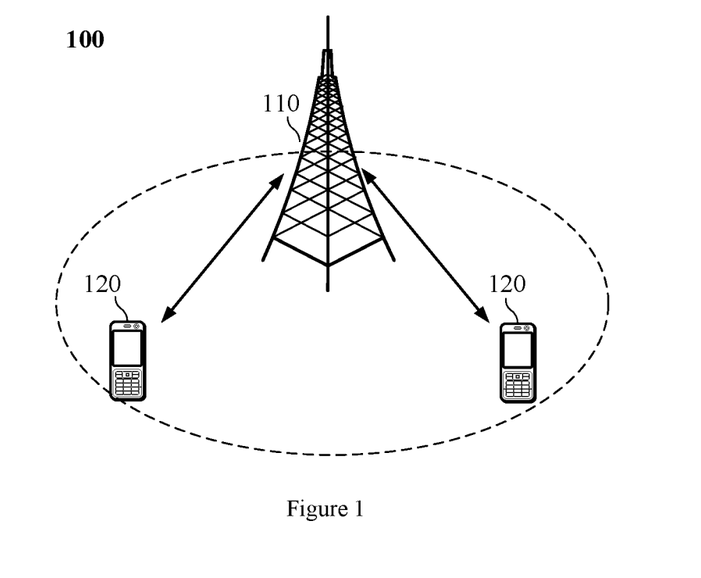
FIG. 1 is a schematic diagram of a communication system architecture according to an implementation of this application.

For example, a communication system 100 applied in the implementation of this application is shown in FIG. 1. The communication system 100 may include a network device 110, and the network device 110 may be a device that communicates with a terminal device 120 (or called a communication terminal, terminal). The network device 110 can provide communication coverage for a specific geographic area, and can communicate with terminal devices located within the coverage area. Optionally, the network device 110 may be Base Transceiver Station (BTS) in a GSM system or a CDMA system, or may be a NodeB (NB) in a WCDMA system, or an Evolutional Node B (eNB, or eNodeB) in an LTE system, or a Cloud Radio Access Network (CRAN), or the network device may be a mobile switching center, a relay station, an access point, an in-vehicle device, a wearable device, a hub, a switch, a bridge, a router, a network side device in 5G network, a network device in a future evolved Public Land Mobile Network (PLMN), or the like.

The communication system 100 further includes at least one terminal device 120 located within the coverage area of the network device 110. The "terminal device" used herein includes but is not limited to a User Equipment (UE), an access terminal, a user unit, and a user Station, a mobile station, a remote station, a remote terminal, a mobile device, a user terminal, terminal, a wireless communication device, a user agent or user device. The access terminal may be a cellular phone, a cordless phone, or a Session Initiation Protocol (SIP) phone, a Wireless Local Loop (WLL) station, a personal digital assistant (PDA), a handheld device with wireless communication function, a computing device or other processing device connected to a wireless modem, vehicle Devices, wearable devices, terminal devices in the future 5G network or terminal devices in a future evolution of the Public Land Mobile Network (PLMN), or the like, which is not limited in the implementations of the present invention.

Optionally, direct terminal connection (Device to Device, D2D) communication may be performed between the terminal devices 120.

Optionally, the 5G system or 5G network may also be referred to as a New Radio (NR) system or NR network.

FIG. 1 exemplarily shows one network device and two terminal devices. Optionally, the communication system 100 may include multiple network devices and the coverage area of each network device may include other numbers of terminal devices. The implementations of this application do not limit this.

Optionally, the communication system 100 may also include other network entities such as a network controller and a mobility management entity, which are not limited in the implementations of this application.

It should be understood that, a device with a communication function in the network/system in the implementations of this application may be referred to as a communication device. Using the communication system 100 shown in FIG. 1 as an example, the communication device may include a network device 110 and a terminal device 120 that have the communication function. The network device 110 and the terminal device 120 may be specific devices described above, and are not described herein again; the communication device may also include other devices in the communication system 100, such as network controllers, mobility management entities and other network entities. This is not limited in the implementations of this application.

It should be understood that the terms "system" and "network" in this specification are generally used interchangeably in this specification. The term "and/or" in this specification is merely an association relationship for describing associated objects and represent that three kinds of relationships may exist. For example, A and/or B may represent the following three: only A exists, both A and B exist, and only B. In addition, the character "I" in this specification generally means an "or" relationship between the associated objects before and after.

On the unlicensed spectrum, a communication device (such as a network device) needs to perform Listen before Talk (LBT) detection on the channels on the unlicensed spectrum before sending signals. If LBT is successful, the communication device can perform the signal Transmission; if LBT fails, the communication device cannot transmit the signal. Because the transmission device is uncertain when sending the signal, the receiving device needs to perform blind detection when receiving to determine whether the transmission device successfully sends the signal. In order to ensure fairness, in one transmission, the time that the communication device uses the unlicensed spectrum channel for signal transmission cannot exceed the Maximum Channel Occupation Time (MCOT).

In the LTE system, in order to ensure the reliability of the uplink information, the downlink channel/signal is transmitted on the unlicensed spectrum, and the uplink information corresponding to the downlink channel/signal is transmitted on the licensed spectrum.

The NR system needs to support independent work, so it needs to support the transmission of uplink information corresponding to the downlink channel/signal on the unlicensed spectrum.

Figure 2:
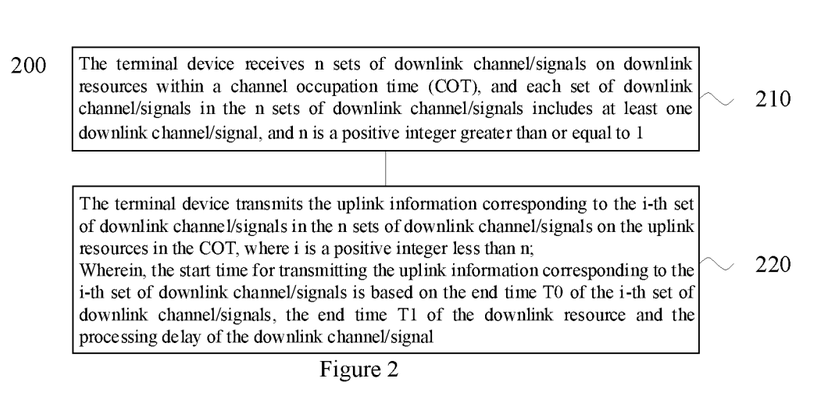
FIG. 2 is a schematic diagram of a method for information transmission according to an implementation of this application.

FIG. 2 shows a schematic block diagram of a method 200 for information transmission based on an implementation of the application. As shown in FIG. 2, the method 200 includes some or all of the following:

S210: The terminal device receives n sets of downlink channel/signals on downlink resources within a channel occupation time (COT), and each set of downlink channel/signals in the n sets of downlink channel/signals includes at least one downlink channel/signal, and n is a positive integer greater than or equal to 1;

S220, the terminal device transmits the uplink information corresponding to the i-th set of downlink channel/signals in the n sets of downlink channel/signals on the uplink resources in the COT, where i is a positive integer less than n;

Wherein, the starting time for transmission of the uplink information corresponding to the i-th set of downlink channel/signals is based on the ending time T0 of the i-th set of downlink channel/signals, the ending time T1 of the downlink resource and the processing latency of the downlink channel/signal.

First of all, it should be noted that the downlink channel/signal may be a physical downlink shared channel (PDSCH) that carries data, and the uplink information corresponding to the PDSCH may be feedback response information, that is, acknowledge (ACK)/non-acknowledge (NACK) information, the downlink channel/signal may also be a channel state information reference signal (CSI-RS), and the uplink information corresponding to the ACK/NACK information may be measurement information. The purpose of CSI-RS for the terminal device to obtain the channel state information (CSI), so as to measure the downlink channel and feed the measurement information back to the network device. Optionally, the downlink channel/signal may also be a cell-specific reference signals (CRS), the purpose of CRS is also for the terminal device to obtain CSI, so as to measure the downlink channel and feedback the measurement information to the network device.

In addition, the setting of downlink channel/signals can be based on whether the corresponding uplink information is carried on the same channel, or based on other factors. For example, it can be based on chronological order to divide every two downlink channel/signals into a set. The implementations of this application do not limit the setting of downlink channel/signals.

In the implementations of this application, the n sets of downlink channel/signals may be arranged based on chronological order. For example, in the n sets of downlink channel/signals, the ending time of the first set of downlink channel/signals is earlier than the second set of downlink channel/signals, the ending time of the second set of downlink channel/signals is earlier than the third set of downlink channel/signals, . . . , and so on. The implementations of this application do not limit the starting time of each set of downlink channel/signals.

In the implementations of this application, the n sets of downlink channel/signals may be arranged based on the corresponding uplink information transmission sequence. For example, in the n sets of downlink channel/signals, the starting time of the uplink information corresponding to the first set of downlink channel/signals is earlier than the uplink information corresponding to the second set of downlink channel/signals, the starting time of the uplink information corresponding to the second set of downlink channel/signals is earlier than the uplink information corresponding to the third set of downlink channel/signals, . . . , and so on.

In a COT, there may be one or more uplink and downlink conversion points. For the implementations of this application, it is not limited that the downlink resource where the downlink channel/signal is located is adjacent to the corresponding uplink resource. But for the convenient to describe, the following implementations take the downlink resource and the adjacent uplink resource as an example.

The terminal device in the implementations of this application can receive n sets of downlink channel/signals on the downlink resource, and n can be understood as: if the (n+1)th set of downlink channel/signals are sent on the downlink resource, then there is no resource that can send its corresponding uplink information on the uplink resource. Or n can also be understood as: the maximum set value of the downlink channel/signal sent by the network device, and the uplink information corresponding to the n sets of downlink channel/signals can all be on the uplink resource transmission.

The starting time for transmission of the uplink information corresponding to the i-th set of downlink channel/signals may be determined by combining the ending time T0 of the i-th set of downlink channel/signals, the ending time T1 of the downlink resource, and the processing latency of the downlink channel/signals. For example, the downlink channel/signal is PDSCH, and the corresponding uplink information is ACK/NACK information, and the starting time for transmission of the ACK/NACK information is based on the ending time of PDSCH, the ending time of downlink resources, and the processing latency of PDSCH. For another example, the downlink The channel/signal is CSI-RS, and the corresponding uplink information is measurement information. The starting time of transmission of the measurement information is based on the ending time of CSI-RS, the ending time of downlink resources, and the processing latency of CSI.

Among them, the value of the PDSCH processing latency can be affected by the following factors: the PDSCH decoding latency, the physical channel that carries the corresponding uplink information, such as the physical uplink shared channel (PUSCH) or the physical uplink control channel (PUCCH), the structure of demodulation reference signal (DMRS) in PDSCH, and the resource mapping method of PDSCH. The value of CSI processing latency is affected by the following factors: CSI calculation latency, CSI Type (Type I CSI feedback or Type II CSI feedback) or content (Channel Quality Indicator (CQI) only, CQI+ Rank Indication (RI)+ Precoding Matrix Indicator (PMI), bandwidth CSI, Subband CSI, etc.), the reference signal structure used to calculate CSI, and the physical channel (PUCCH or PUSCH) carrying CSI.

Optionally, in the implementations of this application, if the i-th set of downlink channel/signals is the first set of downlink channel/signals in the n-th set of downlink channel/signals, then the starting time of the uplink information corresponding to the first set of downlink channel/signals is directly determined based on the ending time of the first set of downlink channel/signals, the ending time of the downlink resources, and the processing latency of the downlink channel/signals. If the i-th set of downlink channel/signals is the second set, the third set . . . of downlink channel/signals in the n sets of downlink channels, then the starting time of transmission of the uplink information corresponding to the i-th set of downlink channel/signals is related not only to the ending time of the i-th set of downlink channel/signals, the ending time of the downlink resource and the processing latency of the downlink channel/signal, but also to the ending time of transmission of the uplink information corresponding to the previous set of downlink channel/signals.

For example, for any set of downlink channel/signals, a time value can be determined based on the ending time of the set of downlink channel/signals, the ending time of downlink resources, and the processing latency of downlink channel/signals. For the first set of downlink channel/signals, the determined time value can be considered as the starting time of transmission of the corresponding uplink information. For the second and subsequent set of downlink channel/signals, the larger one of the determined time value and the ending time of transmission of the uplink information corresponding to the previous set of downlink channel/signals is used as the starting time of transmission of the corresponding uplink information.

Therefore, the method for information transmission in the implementations of this application transmits the uplink information corresponding to the downlink channel/signal on the uplink resource in the same cot, and the starting time of transmission of the corresponding uplink information is determined based on the ending time of the corresponding downlink channel/signal, the ending time of the downlink resource, and the processing latency of the downlink channel/signal, which is conducive to the reliable transmission of the uplink information corresponding to the downlink channel/signal.

Figure 3:
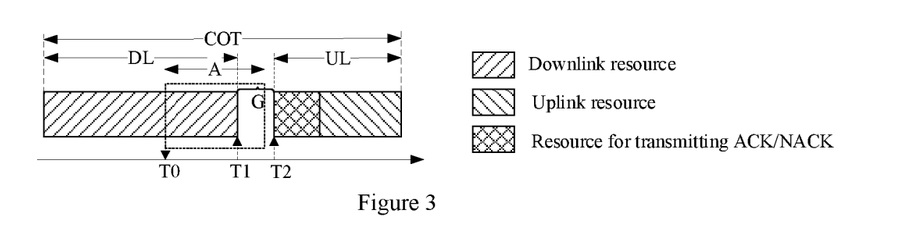
FIG. 3 is a schematic diagram of determining the starting time of transmitting corresponding uplink information according to an implementation of this application.
Figure 4:
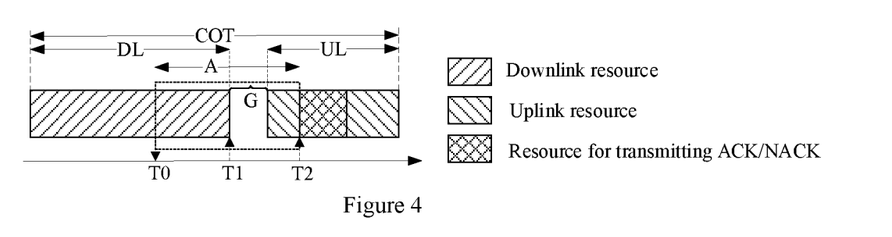
FIG. 4 is another schematic diagram of determining the starting time of transmitting corresponding uplink information according to an implementation of this application.
Figure 5:
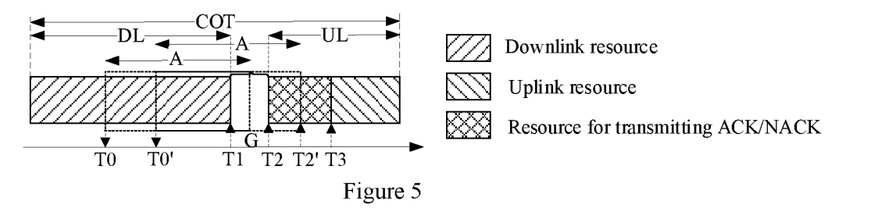
FIG. 5 is another schematic diagram of determining the starting time of transmitting corresponding uplink information according to an implementation of this application.

In conjunction with FIGS. 3 to 5, the following will describe in detail how to determine a time value based on the ending time of any set of downlink channel/signals, the ending time of downlink resources, and the processing latency of downlink channel/signals.

As shown in FIG. 3, a COT includes a downlink (DL) resource and an uplink (UL). The downlink channel/signal (here, PDSCH is taken as an example) is transmitted on the DL, and its corresponding uplink information (taking ACK/NACK as an example here) transmit on the UL. The interval between the downlink resource and the downlink resource is G. The terminal device receives a set of PDSCHs at T0, that is, the ending time of the set of PDSCHs is T0. The processing latency of the PDSCH is A. The ending time of the downlink resource is T1. The determined time value is T2. If T0+A is less than or equal to T1+G, then T2 can be the starting time of the uplink resource, or T1+G, or the starting position of the first symbol starting from T1+G. Or, as shown in FIG. 3, A can be regarded as subtracting G from the processing latency of PDSCH, then if T0+A is less than or equal to T1, similarly, T2 can be considered as T1+G. If it is the first set of PDSCHs, then the T2 is the starting time of transmission of its corresponding ACK/NACK. If it is a later set of PDSCHs, then the maximum value of T2 and the ending time of transmission the ACK/NACK corresponding to the previous set of PDSCHs can be considered as the starting time of transmission of the ACK/NACK corresponding to the set of PDSCHs.

As shown in FIG. 4, a COT includes a downlink (DL) resource and an uplink (UL. The downlink channel/signal (here taking PDSCH as an example) is transmitted on the DL, and its corresponding uplink information (taking ACK/NACK as an example here) is transmitted on the UL. The interval between the downlink resource and the downlink resource is G. The terminal device receives a set of PDSCHs at T0, that is, the ending time of the set of PDSCHs is T0. The processing latency of the PDSCH is A. The ending time of the downlink resource is T1. The determined time value is T2. If T0+A is greater than T1+G, then T2 can be T0+A, or from the starting position of the first symbol from T0+A. Or, as shown in FIG. 4, A can be regarded as subtracting G from the processing latency of PDSCH, then if T0+A is greater than T1, similarly, T2 can be regarded as T0+A. If it is the first set of PDSCHs, then T2 is the starting time of transmission of its corresponding ACK/NACK. If it is a later set of PDSCHs, then the maximum value of T2 and the ending time of transmission of ACK/NACK corresponding to the previous set of PDSCHs can be considered as the starting time of transmission of ACK/NACK corresponding to the set of PDSCHs.

As shown in FIG. 5, the two sets of downlink channel/signals received on the downlink resource is used as an example. The ending time of the first set of PDSCHs is T0. The ending time of the second set of PDSCHs is T0'. The ending time of the downlink resource is T1. Since T0+A is less than T1+G, T2 can be considered as the starting time of transmission of the ACK/NACK information corresponding to the first set of PDSCHs. And since T0'+A is greater than T1+G, T2' can be T0'+A. Since the ending time T3 of transmission of the ACK/NACK information corresponding to the first set of PDSCHs is greater than T2', then T3 can be regarded as the starting time of transmission of the ACK/NACK information corresponding to the second set of PDSCHs.

It should be noted that in the implementations of this application, A can be agreed by a protocol or configured by the network. It can be based on the processing latency of the downlink channel/signal plus or minus an offset. And G can also be agreed by the protocol or configured by the network. For example, G can be less than or equal to 16 us, so that the terminal device does not need to perform LBT before sending the corresponding uplink information, which is beneficial to avoid the corresponding uplink information cannot be uploaded due to other communication devices occupying the channel.

It should be understood that the starting time of transmission of the uplink information corresponding to a certain set of downlink channel/signals determined by the terminal device may be a time value obtained based on the above judgment methods.

And the time value may be considered as the minimum value for transmission of the corresponding uplink information. That is to say, once the time value is obtained, any time after the time value can be used as the starting time of transmission of the corresponding uplink information.

It should also be understood that the ending time of the uplink information corresponding to each set of downlink channel/signals can be agreed by the protocol or configured by the network. Or the time length of transmission of the uplink information corresponding to a certain set of downlink channel/signals can also be agreed or configured.

Optionally, in the implementations of this application, the terminal device can determine a time value based on the ending time of the first set of downlink channel/signals, the ending time of downlink resources, and the processing latency of the downlink channel/signals. Any value greater than or equal to the time value can be directly as the starting time of transmission of the corresponding uplink information. The terminal device can also receive the configuration of the network device, and compare the network configuration time with the determined time value, if the network configuration time is less than the time value, the terminal device can consider it as a wrong configuration, and can use any value greater than or equal to the time value as the starting time of transmission of the corresponding uplink information. If the network configuration time is greater than or equal to the time value, the terminal device can directly used the network configuration time as the starting time of transmission of the corresponding uplink information.

Optionally, in the implementations of this application, the terminal device can determine a time value based on the ending time of any set of downlink channel/signals after the first set, the ending time of downlink resources, and the processing latency of the downlink channel/signals. The maximum value of the time value and the ending time of transmission of the uplink information corresponding to the previous set of downlink channel/signals is used as the lower limit of the starting time of transmission of the corresponding uplink information. The terminal device can also receive the network device configuration and compare the network configuration time with the selected maximum value. If the network configuration time is less than the maximum value, the terminal device can consider the network configuration time as an incorrect configuration and take any value greater than or equal to the maximum value by itself as the starting time of transmission of the corresponding uplink information. If the network configuration time is greater than or equal to the maximum value, the terminal device can directly use the network configuration time as the starting time of transmission of the corresponding uplink information.

Optionally, in the implementations of this application, if the ending time of the n sets of downlink channel/signals is less than T1, the method further includes: the terminal device receives a specific downlink channel/signal/information between the ending time of the n sets of downlink channel/signals and T1. Wherein, the specific downlink channel/signal/information does not have corresponding uplink information, or the specific downlink channel/signal/information is common channel/signal/information.

It should be understood that, in the implementations of this application, the ending time of a certain set of downlink channel/signals refers to the last time of the set of downlink channel/signals. For the ending time of the n sets of downlink channel/signals in the implementations of this application also refers to the last end time of the n sets of downlink channel/signals. The n sets of downlink channel/signals have been explained above, and will not be repeated here for brevity.

The terminal device can receive a specific type of downlink channel/signal/information on the downlink resources after the n sets of downlink channel/signals. For example, the specific downlink channel/signal/information may not have corresponding uplink information, or the specific downlink channel/signal/information may be one or more of a broadcast channel, a synchronization signal, a CSI-RS, a downlink control channel, and a UE-set common signalling, or it can be some information that may appear in future, for example, the information may not be carried through a channel.

Optionally, in the implementations of this application, if the starting time of transmission of the uplink information corresponding to the i-th set of downlink channel/signals is greater than the starting time of the uplink resource or the ending time of transmission of the uplink information corresponding to the (i−1)th set of downlink channel/signals, the method further includes: the terminal device sends a specific uplink channel/signal between the starting time of the uplink resource and the starting time of transmission of the uplink information corresponding to the i-th set of downlink channel/signals, or the terminal device sends a specific uplink between the ending time of transmission of the uplink information corresponding to the (i−1)th set of downlink channel/signals and the starting time of transmission of the uplink information corresponding to the i-th set of downlink channel/signals; wherein, the specific uplink channel/signal includes at least one of the following information: information used for occupancy, a sounding reference signal (SRS), a physical uplink shared channel (PUSCH), and a demodulation reference signal (DMRS).

Specifically, the information used for occupancy has no practical effect, preventing other communication devices from occupying the channel during this time period. PUSCH can refer to pre-scheduled PUSCH, and the network device can send scheduling signalling in the downlink resource in the COT to schedule the PUSCH. Or the network device can also schedule the PUSCH through a high-level signaling configuration. DMRS, the frequency domain resource for transmission of DMRS can be the same as the frequency domain resource for transmission of the corresponding uplink information. The terminal device can transmit DMRS in advance, and DMRS resources can no longer be reserved in the channel carrying the corresponding uplink information, which is beneficial to improving transmission efficiency.

The terminal device can transmit the above-mentioned specific uplink channel/signal/information between the starting time of the uplink resource and the starting time of transmission of the uplink information corresponding to the first set of downlink channel/signals. And the terminal device can also transmit the above-mentioned specific uplink channel/signal/information between the starting times of transmission of the uplink information corresponding to every two sets of the downlink channel/signals.

Figure 6:
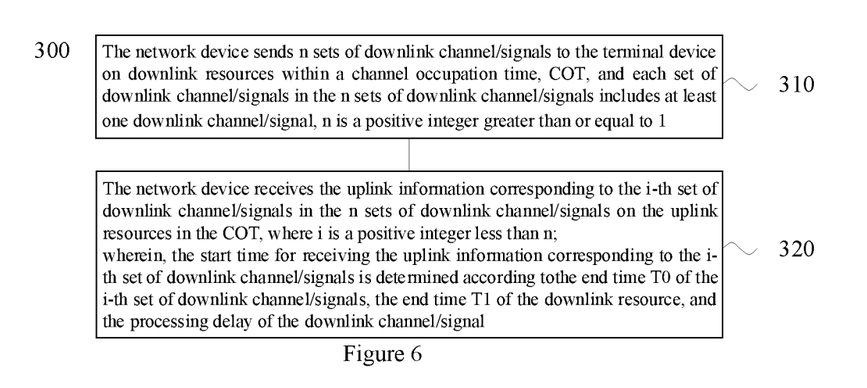
FIG. 6 is another schematic diagram of a method for information transmission according to an implementation of this application.

FIG. 6 is a schematic block diagram of a method 300 for information transmission according to an implementation of this application. As shown in FIG. 6, the method 300 includes some or all of the following:

S310, the network device sends n sets of downlink channel/signals to the terminal device on downlink resources within a channel occupation time, COT, and each set of downlink channel/signals in the n sets of downlink channel/signals includes at least one downlink channel/signal, n is a positive integer greater than or equal to 1;

S320, the network device receives the uplink information corresponding to the i-th set of downlink channel/signals in the n sets of downlink channel/signals on the uplink resources in the COT, where i is a positive integer less than n;

wherein, the starting time for receiving the uplink information corresponding to the i-th set of downlink channel/signals is determined based on the ending time T0 of the i-th set of downlink channel/signals, the ending time T1 of the downlink resource, and the processing latency of the downlink channel/signal.

Therefore, the method for information transmission in the implementations of this application transmits the uplink information corresponding to the downlink channel/signal on the uplink resource in the same COT, and determines the starting time of transmission of the corresponding uplink information, the ending time of the downlink resource, and the processing latency of the downlink channel/signal, which is conducive to the reliable transmission of the uplink information corresponding to the downlink channel/signal.

Optionally, in the implementations of this application, i is greater than 1, and the starting time of receiving the uplink information corresponding to the i-th set of downlink channel/signals is determined based on the ending time T0 of the i-th set of downlink channel/signals, the ending time T1 of the downlink resource, the ending time of the uplink information corresponding to the (i–1)th set of downlink channel/signals, and the processing latency.

Optionally, in the implementations of this application, the starting time for receiving the uplink information corresponding to the i-th set of downlink channel/signals is the maximum value of the ending time of receiving the uplink information corresponding to the (i–1)th set of downlink channel/signals, the ending time T0 of the i-th set of downlink channel/signals, the ending time T1 of the downlink resource and the processing latency.

Optionally, in the implementations of this application, the method further includes: the network device sends configuration information to the terminal device, and the configuration information is configured to indicate the starting time of receiving the uplink information corresponding to the i-th set of downlink channel/signals, the time indicated by the configuration information is not earlier than the first threshold, and the first threshold is the maximum value of the ending time of receiving the uplink information corresponding to the (i–1)th set of downlink channel/signals, ending time T0 of the i-th set of downlink channel/signals, the ending time T1 of the downlink resource and the processing latency.

Optionally, in the implementations of this application, if (T0+A) is less than or equal to (T1+G), the time determined based on T0, T1 and the processing latency is (T1+G) or the starting position of the first symbol from (T1+G)). Wherein, A is the processing latency, and G is the interval between the downlink resource and the uplink resource.

Optionally, in the implementations of this application, if (T0+A) is less than or equal to T1, the time determined based on T0, T1 and the processing latency is (T1+G) or the starting position of the first symbol from (T1+G). Wherein, A is the processing latency, and G is the interval between the downlink resource and the uplink resource.

Optionally, in the implementations of this application, if (T0+A) is greater than (T1+G), the time determined based on T0, t1 and the processing latency is (T0+A) or the starting position of the first symbol from (T0+A). Wherein, A is the processing latency, and G is the interval between the downlink resource and the uplink resource.

Optionally, in the implementations of this application, if (T0+A) is greater than T1, the time determined based on T0, T1 and the processing latency is (T0+A) or the starting position of the first symbol from (T0+A). Wherein, A is determined based on the processing latency.

Optionally, in the implementations of this application, if the ending time of the n sets of downlink channel/signals is less than T1, the method further includes: the network device sends the specific downlink channel/signal/information to the terminal device between the ending time of the n sets of downlink channel/signals and T1. Wherein, the specific downlink channel/signal/information has no corresponding uplink information, or the specific downlink channel/signal/information is common channel/signal/information.

Optionally, in the implementations of this application, the common channel/signal/information includes a broadcast channel, a synchronization signal, a channel state information reference signal (CSI-RS), a downlink control channel or a terminal device set common signaling.

Optionally, in the implementations of this application, if the starting time of receiving the uplink information corresponding to the i-th set of downlink channel/signals is greater than the starting time of the uplink resource or the ending time of receiving the uplink information corresponding to the (i–1)th set of downlink channel/signals, the method further includes: the network device receives a specific uplink channel/signal between the starting time of the uplink resource and the starting time of transmission of the uplink information corresponding to the i-th set of downlink channel/signals, or the network device receives a specific channel/signal between the ending time of receiving the uplink information corresponding to the (i–1)th set of downlink channel/signals and the starting time of receiving the uplink information corresponding to the i-th set of downlink channel/signals. Wherein, the specific uplink channel/signal includes at least one of the following information: information for occupancy, a sounding reference signal (SRS), a physical uplink shared channel (PUSCH), and a demodulation reference signal (DMRS).

Optionally, in the implementations of this application, the frequency domain resource occupied by the DMRS is the same as the frequency domain resource occupied by the uplink information corresponding to the i-th set of downlink channel/signals.

Optionally, in the implementations of this application, the uplink information corresponding to the same set of downlink channel/signals in the n sets of downlink channel/signals is transmitted through the same uplink channel, and uplink information corresponding to the different sets of downlink channel/signals in the n sets of downlink channel/signals is transmitted through the different uplink channels.

Optionally, in the implementations of this application, the downlink channel in the i-th set of downlink channels is a physical downlink shared channel (PDSCH), and the uplink information corresponding to the i-th set of downlink channels is feedback response information.

Optionally, in the implementations of this application, the downlink signal in the i-th set of downlink signals is a channel state information reference signal (CSI-RS), and the uplink information corresponding to the i-th set of downlink signals is measurement information.

Optionally, in the implementations of this application, the ending time of the uplink information corresponding to the i-th set of downlink channel/signals is a network configuration or protocol agreement.

Optionally, in the implementations of this application, G is network device configuration or protocol agreement, and G=16 us.

It should be understood that the interaction, related characteristics and functions between the network device and the terminal device described by the network device correspond to the related characteristics and functions of the terminal device. That is to say, the network device sends some massage to the terminal device, and the terminal device receives the corresponding message from the network device.

It should also be understood that, in the various implementations of this application, the size of the sequence number of the above-mentioned processes does not mean the execution order, and the execution order of each process should be determined by its function and internal logic, and the implementation process of the implementation process should not be limited.

The method for information transmission according to the implementations of this application is described in detail above. And the apparatus for information transmission according to the implementations of this application will be described below in conjunction with FIG. 7 to FIG. 10. The technical features described in the method implementations are applicable to the following device implementations.

Figure 7:
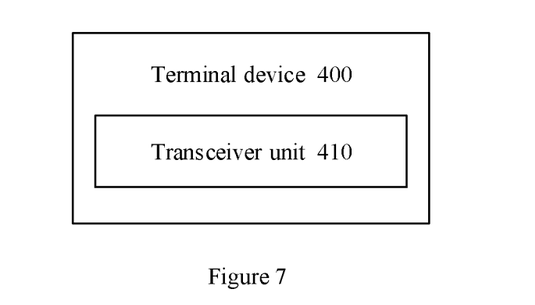
FIG. 7 is a schematic block diagram of a terminal device according to an implementation of this application.

FIG. 7 shows a schematic block diagram of a terminal device 400 of an implementation of this application. As shown in FIG. 7, the terminal device 400 includes:

The transceiver unit 410, configured to receive n sets of downlink channel/signals on downlink resources within a channel occupation time (COT), and transmit uplink information corresponding to the i-th set of downlink channel/signals in the n sets of downlink channel/signals on the uplink resources within the COT; each set of the downlink channel/signals in the n sets of downlink channel/signals includes at least one downlink channel/signal, n is a positive integer greater than or equal to 1, and i is a positive integer less than n Integer; the starting time of transmission of the uplink information corresponding to the i-th set of downlink channel/signals is determined based on the ending time T0 of the i-th set of downlink channel/signals, the ending time T1 of the downlink resources, and the processing latency of the downlink channel/signal.

Optionally, in the implementations of this application, i is greater than 1, and the starting time of transmission of the uplink information corresponding to the i-th set of downlink channel/signals is determined based on the ending time T0 of the i-th set of downlink channel/signals, the ending time T1 of the downlink resource, the ending time of the uplink information corresponding to the (i−1)th set of downlink channel/signals, and the processing latency.

Optionally, in the implementations of this application, the starting time of transmission of the uplink information corresponding to the i-th set of downlink channel/signals is the maximum value of the maximum value, the ending time T0 of the i-th set of downlink channel/signals, the ending time T1 of the downlink resource, and the processing latency.

Optionally, in the implementations of this application, the transceiving unit is further configured to: receive configuration information of a network device, wherein the configuration information is configured to indicate the starting time of transmission of the uplink information corresponding to the i-th set of downlink channel/signals, the time indicated by the configuration information is not less than a first threshold, and the first threshold is maximum value of the ending time of transmission of the uplink information corresponding to the (i−1)th set of downlink channel/signals, the ending time T0 of the i-th set of downlink channel/signals, ending time T1 of the downlink resource and the processing latency.

Optionally, in the implementations of this application, if (T0+A) is less than or equal to (T1+G), the time determined based on T0, T1 and the processing latency is (T1+G) or the starting position of the first symbol from (T1+G). Wherein A is the processing latency, and G is the interval between the downlink resource and the uplink resource.

Optionally, in the implementations of this application, if (T0+A) is less than or equal to T1, the time determined based on T0, T1 and the processing latency is (T1+G) or the starting position of the first symbol from (T1+G), wherein A is determined based on the processing latency, and G is the interval between the downlink resource and the uplink resource.

Optionally, in the implementations of this application, if (T0+A) is greater than (T1+G), the time determined based on T0, T1 and the processing latency is (T0+A) or the starting position of the first symbol from (T0+A), wherein A is the processing latency, and G is the interval between the downlink resource and the uplink resource.

Optionally, in the implementations of this application, if (T0+A) is greater than T1, the time determined based on T0, T1 and the processing latency is (T0+A) or starting position of the first symbol from (T0+A), wherein A is determined based on the processing latency.

Optionally, in the implementations of this application, if the ending time of the n sets of downlink channel/signals is less than T1, the transceiver unit is further configured to: receive a specific downlink channel/signal/information between the ending time of the n sets of downlink channel/signals and T1, wherein, the specific downlink channel/signal/information does not have corresponding uplink information, or the specific downlink channel/signal/information is common channel/signal/information.

Optionally, in the implementations of this application, the common channel/signal/information includes a broadcast channel, a synchronization signal, a CSI-RS, a downlink control channel or a terminal device set common signaling.

Optionally, in the implementations of this application, if the starting time of transmission of the uplink information corresponding to the i-th set of downlink channel/signals is greater than the starting time of the uplink resource or the ending time of transmission of the uplink information corresponding to the (i−1)th set of the downlink channel/signals, the transceiving unit is further configured to: send a specific uplink channel/signal between the starting time of the uplink resource and the starting time of transmission of the uplink information corresponding to the i-th set of downlink channel/signals, or send a specific uplink channel/signal between the ending time of transmission of the uplink information corresponding to the (i−1)th set of downlink channel/signals and the starting time of transmission of the uplink information corresponding to the i-th set of downlink channel/signals, wherein, the specific uplink channel/signal includes at least one of the following information: information used for occupancy, a sounding reference signal (SRS), a physical uplink shared channel (PUSCH), and a demodulation reference signal (DMRS).

Optionally, in the implementations of this application, the frequency domain resources occupied by the DMRS are the same as the frequency domain resources occupied by the uplink information corresponding to the i-th set of downlink channel/signals.

Optionally, in the implementations of this application, the uplink information corresponding to the same set of downlink channel/signals in the n sets of downlink channel/signals is transmitted through the same uplink channel, and the uplink information corresponding to the different sets of downlink channel/signals in the n sets of downlink channel/signals is transmitted through the different uplink channels.

Optionally, in the implementations of this application, the downlink channel in the i-th set of downlink channels is a PDSCH, and the uplink information corresponding to the i-th set of downlink channels is feedback response information.

Optionally, in the implementations of this application, the downlink signal in the i-th set of downlink signals is a CSI-RS, and the uplink information corresponding to the i-th set of downlink signals is measurement information.

Optionally, in the implementations of this application, the ending time of the uplink information corresponding to the i-th set of downlink channel/signals is network configuration or protocol agreement.

Optionally, in the implementations of this application, G is network device configuration or protocol agreement, and G=16 us.

It should be understood that the terminal device 400 based on the implementations of this application may correspond to the terminal device in the method implementations of this application. The above-mentioned and other operations and/or functions of each unit in the terminal device 400 respectively implement the corresponding process in the terminal device shown in FIG. 2, which will not be repeated here for brevity.

Figure 8:
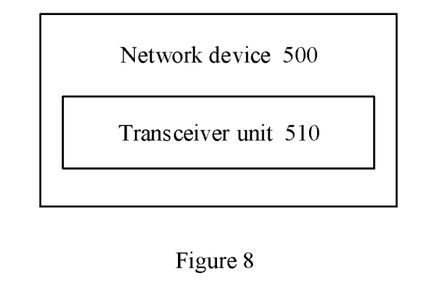
FIG. 8 is a schematic block diagram of a network device according to an implementation of this application.

FIG. 8 shows a schematic block diagram of a network device 500 of an implementation of this application. As shown in FIG. 8, the network device 500 includes:

The transceiver unit 510, configured to send n sets of downlink channel/signals to a terminal device on downlink resources within a channel occupation time (COT), and receive the uplink information corresponding to the i-th set of the downlink channel/signals in the n sets of downlink channel/signals within the COT; wherein, each set of downlink channel/signals in the n sets of downlink channel/signals includes at least one downlink channel/signal, n is a positive integer greater than or equal to 1, and i is less than n, the starting time of receiving the uplink information corresponding to the i-th set of downlink channel/signals is determined based on the ending time T0 of the i-th set of downlink channel/signals, the ending time T1 of the downlink resource, and the processing latency of the downlink channel/signal.

Optionally, in the implementations of this application, i is greater than 1, and the starting time of receiving the uplink information corresponding to the i-th set of downlink channel/signals is determined based on the ending time T0 of the i-th set of downlink channel/signals, ending time T1 of the downlink resource, the ending time of the uplink information corresponding to the (i−1)th set of downlink channel/signals, and the processing latency.

Optionally, in the implementations of this application, the starting time of receiving the uplink information corresponding to the i-th set of downlink channel/signals is the maximum value of the ending time of receiving the uplink information corresponding to the (i−1)th set of downlink channel/signals, the ending time T0 of the i-th set of downlink channel/signals, the ending time T1 of the downlink resource and the processing latency.

Optionally, in the implementations of this application, the transceiving unit is further configured to: send configuration information to the terminal device, wherein the configuration information is configured to indicate that the starting time of the uplink information corresponding to the i-th set of downlink channel/signals, the time indicated by the configuration information is not less than a first threshold, and the first threshold is the maximum value of the ending time for receiving the uplink information corresponding to the (i−1)th set of downlink channel/signals, the ending time T0 of the set of downlink channel/signal, the ending time T1 of the downlink resource and the processing latency.

Optionally, in the implementations of this application, if (T0+A) is less than or equal to (T1+G), the time determined based on T0, T1 and the processing latency is (T1+G) or the starting position of the first symbol from (T1+g), wherein A is the processing latency, and G is the interval between the downlink resource and the uplink resource.

Optionally, in the implementations of this application, if (T0+A) is less than or equal to T1, the time determined based on T0, T1 and the processing latency is (T1+G) or the starting position of the first symbol from (T1+G), wherein A is determined based on the processing latency, and G is the interval between the downlink resource and the uplink resource.

Optionally, in the implementations of this application, if (T0+A) is greater than (T1+G), the time determined based on T0, T1 and the processing latency is (T0+A) or the starting position of the first symbol from (T0+A), wherein A is the processing latency, and G is the interval between the downlink resource and the uplink resource.

Optionally, in the implementations of this application, if (T0+A) is greater than T1, the time determined based on T0, T1 and the processing latency is (T0+A) or the starting position of the first symbol from (T0+A), wherein A is determined based on the processing latency.

Optionally, in the implementations of this application, if the ending time of the n sets of downlink channel/signals is less than T1, the transceiver unit is further configured to: send a specific downlink channel/signal/information to the terminal device between the ending time of the n sets of downlink channel/signals and T1; wherein, the specific downlink channel/signal/information does not have corresponding uplink information, or the specific downlink channel/signal/information is common channel/signal number information.

Optionally, in the implementations of this application, the common channel/signal/information includes a broadcast channel, a synchronization signal, a CSI-RS, a downlink control channel or a terminal device set common signaling.

Optionally, in the implementations of this application, if the starting time of receiving the uplink information corresponding to the i-th set of downlink channel/signals is greater than the starting time of the uplink resource or the ending time of receiving the uplink information corresponding to the (i−1)th set downlink channel/signals, the transceiver unit is further configured to: receive a specific uplink channel/signal between the starting time of the uplink resource and the starting time of transmission of the uplink information corresponding to the i-th set of downlink channel/signals, or receive a specific uplink channel/signal between the ending time of receiving the uplink information corresponding to the (i−1)th set of downlink channel/signals and the starting time of receiving the uplink information corresponding to the i-th set of downlink channel/signals; wherein, the specific uplink channel/signal includes at least one of the following information: information for occupying a position, a SRS, a PUSCH, and a DMRS.

Optionally, in the implementations of this application, the frequency domain resources occupied by the DMRS are the same as the frequency domain resources occupied by the uplink information corresponding to the i-th set of downlink channel/signals.

Optionally, in the implementations of this application, the uplink information corresponding to the same set of downlink channel/signals in the n sets of downlink channel/signals is transmitted through the same uplink channel, and the uplink information corresponding to the different sets of downlink channel/signals in the n sets of downlink channel/signals is transmitted through the different uplink channels.

Optionally, in the implementations of this application, the downlink channel in the i-th set of downlink channels is a PDSCH, and the uplink information corresponding to the i-th set of downlink channels is feedback response information.

Optionally, in the implementations of this application, the downlink signal in the i-th set of downlink signals is a CSI-RS, and the uplink information corresponding to the i-th set of downlink signals is measurement information.

Optionally, in the implementations of this application, the ending time of the uplink information corresponding to the i-th set of downlink channel/signals is network configuration or protocol agreement.

Optionally, in the implementations of this application, G is network device configuration or protocol agreement, and G=16 us.

It should be understood that the network device 500 based on the implementations of this application may correspond to the network device in the method implementations of this application, and the above-mentioned and other operations and/or functions of each unit in the network device 500 respectively implement the process in the network device shown in the FIG. 6, which will not be repeated here for brevity.

Figure 9:
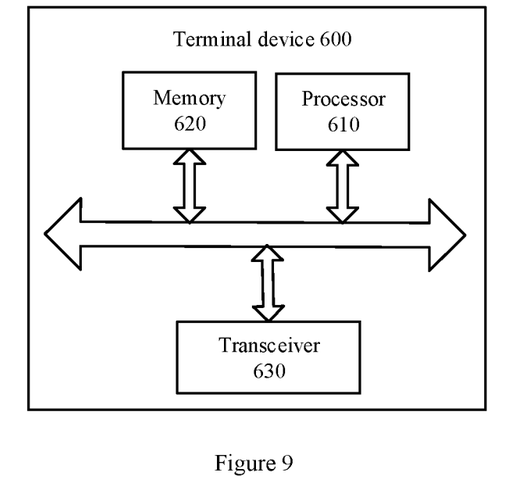
FIG. 9 is another schematic block diagram of a terminal device according to an implementation of this application.

As shown in FIG. 9, an implementation of this application also provides a terminal device 600. The terminal device 600 may be the terminal device 400 in FIG. 7, which can be configured to perform the process in the terminal device corresponding to the method 200 in FIG. 2. The terminal device 600 shown in FIG. 9 includes a processor 610, and the processor 610 can invoke and run a computer program from the memory to implement the method in the implementations of this application.

Optionally, as shown in FIG. 9, the terminal device 600 may also include a memory 620. Wherein, the processor 610 may invoke and run a computer program from the memory 620 to implement the method in the implementations of this application.

Wherein, the memory 620 may be a separate device independent of the processor 610 or may be integrated in the processor 610.

Optionally, as shown in FIG. 9, the terminal device 600 may also include a transceiver 630, and the processor 610 may control the transceiver 630 to communicate with other devices. Specifically, it may send information or data to other devices, or receive information or data from other devices.

Wherein, the transceiver 630 may include a transmitter and a receiver. The transceiver 630 may further include an antenna, and the number of antennas may be one or more.

Optionally, the terminal device 600 may be a terminal device of implementations of this application, and the terminal device 600 may implement the corresponding process implemented by the terminal device in each method of the implementations of this application. The details are not repeated here for brevity.

In an implementation, the transceiver unit in the terminal device 600 may be implemented by the transceiver 630 in FIG. 9.

Figure 10:
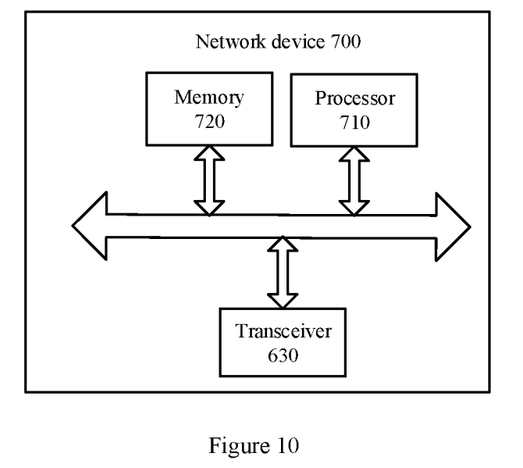
FIG. 10 is another schematic block diagram of a network device according to an implementation of this application.

As shown in FIG. 10, an implementation of this application also provides a network device 700. The network device 700 may be the network device 500 in FIG. 8, which can be configured to perform the process of the network device corresponding to the method 300 in FIG. 6. The network device 700 shown in FIG. 10 includes a processor 710, and the processor 710 can invoke and run a computer program from a memory to implement the method in the implementations of this application.

Optionally, as shown in FIG. 10, the network device 700 may also include a memory 720. Wherein, the processor 710 may invoke and run a computer program from the memory 720 to implement the method in the implementations of this application.

Wherein, the memory 720 may be a separate device independent of the processor 710 or may be integrated in the processor 710.

Optionally, as shown in FIG. 10, the network device 700 may further include a transceiver 730, and the processor 710 may control the transceiver 730 to communicate with other devices. Specifically, it may send information or data to other devices, or receive information or data from the other devices.

Wherein, the transceiver 730 may include a transmitter and a receiver. The transceiver 730 may further include an antenna, and the number of antennas may be one or more.

Optionally, the network device 700 may be a network device of the implementations of this application, and the network device 700 may implement the corresponding process implemented by the network device in each method of the implementations of this application. For brevity, details are not repeated here.

In a specific implementation, the processing unit in the network device 700 may be implemented by the processor 710 in FIG. 10. The transceiving unit in the network device 700 may be implemented by the transceiver 730 in FIG. 10.

Figure 11:
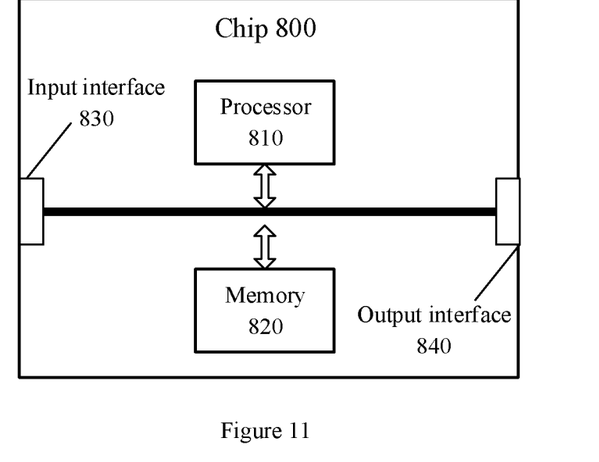
FIG. 11 is a schematic block diagram of a chip according to an implementation of this application.

FIG. 11 is a schematic structural diagram of a chip of an implementation of this application. The chip 800 shown in FIG. 11 includes a processor 810, and the processor 810 can invoke and run a computer program from a memory to implement the method in the implementations of this application.

Optionally, as shown in FIG. 11, the chip 800 may also include a memory 820. Wherein, the processor 810 may invoke and run a computer program from the memory 820 to implement the method in the implementations of this application.

Wherein, the memory 820 may be a separate device independent of the processor 810 or may be integrated in the processor 810.

Optionally, the chip 800 can also include an input interface 830. Wherein, the processor 810 can control the input interface 830 to communicate with other devices or chips, and specifically, can obtain information or data sent by the other devices or chips.

Optionally, the chip 800 can also include an output interface 840. Wherein, the processor 810 can control the output interface 840 to communicate with other devices or chips, specifically, can output information or data to the other devices or chips.

Optionally, the chip can be applied to the network device in the implementations of this application, and the chip can implement the corresponding process implemented by the network device in each method of the implementations of this application. For brevity, details are not repeated here.

Optionally, the chip can be applied to the terminal device in the implementations of this application, and the chip can implement the corresponding process implemented by the terminal device in each method of the implementations of this application. For brevity, details are not repeated here.

It should be understood that the chips mentioned in the implementations of this application may also be referred to as a system-level chip, a system-on-chip, chip system, or system-on-a-chip, or the like.

Figure 12:
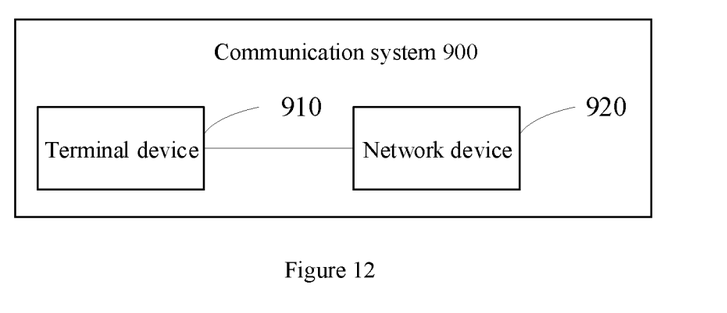
FIG. 12 is a schematic block diagram of a communication system according to an implementation of this application.

FIG. 12 is a schematic block diagram of a communication system 900 based on an implementation of this application. As shown in FIG. 12, the communication system 900 includes a terminal device 910 and a network device 920.

Wherein, the terminal device 910 can be configured to implement the corresponding function implemented by the terminal device in the above methods, and the network device 920 can be configured to implement the corresponding function implemented by the network device in the above methods. For brevity, it will not be repeated here.

It should be understood that the processor of the implementations of this application may be an integrated circuit chip with signal processing capabilities. In the implementation process, the steps of the above method implementations can be implemented through the integrated logic circuit of the hardware in the processor or the instructions in software. The above-mentioned processor can be a general-purpose processor, a digital signal processor (DSP), an application specific integrated circuit (ASIC), a field programmable gate array (FPGA), or other programmable logic devices, discrete gates or transistor logic devices, discrete hardware components, which can implement or perform the methods, steps and logic block diagrams disclosed in the implementations of this application. The general-purpose processor can be a microprocessor or be any conventional processor, etc. The combination with the steps of the method disclosed in the implementations of this application may be directly embodied as an execution of a hardware decoding processor being completed, or an execution of hardware and software modules in the decoding being completed. The software module can be located in random access memory, flash memory, read-only memory, programmable read-only memory or electrically erasable programmable memory, registers and other proven storage media in the field. The storage medium is located in the memory, and the processor reads the information in the memory, combined with its hardware to complete the steps of the above method.

It can be understood that the memory in the implementations of this application may be volatile memory or non-volatile memory, or may include both volatile and non-volatile memory. Wherein, the non-volatile memory may be a read-only memory (ROM), Programmable ROM (PROM), Erasable PROM (EPROM), Electrically Erasable Programmable Read-Only Memory (EEPROM) or flash memory. Volatile memory can be random access memory (RAM), which is used as an external cache. The description is exemplary not restrictive, many forms of RAMs are available, such as a static random access memory (SRAM), a dynamic random access memory (DRAM), a synchronous dynamic random access memory (SDRAM), a double data rate synchronous dynamic random access memory (SDRAM), an enhanced synchronous dynamic random access memory (ESDRAM), a synchronous connection dynamic random access memory (SLDRAM) and a direct memory bus random access memory (DR RAM). It should be noted that, the memories of the systems and methods described herein are intended to include but not limit to these and any other suitable types of memories.

It should be understood that the foregoing memory is exemplary but not restrictive. For example, the memory in the implementations of this application may also be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous connection Dynamic random access memory (SLDRAM) and a direct rambus random access memory (DR RAM), etc. That is to say, the memory in the implementations of this application is intended to include but not limit to these and any other suitable types of memories.

The implementations of this application also provide a computer-readable storage medium for storing computer programs.

Optionally, the computer-readable storage medium can be applied to the network device in the implementations of this application, and the computer program causes the computer to perform the corresponding process implemented by the network device in each method of the implementations of this application. For brevity, it will not be repeated.

Optionally, the computer-readable storage medium can be applied to the terminal device in the implementations of this application, and the computer program causes the computer to perform the corresponding process implemented by the mobile terminal terminal device in each method of the implementations of this application. For brevity, it will not be repeated.

The implementations of this application also provide a computer program product, including computer program instructions.

Optionally, the computer program product can be applied to the network device in the implementations of this application, and the computer program instructions cause the computer to perform the corresponding process implemented by the network device in each method of the implementations of this application. For brevity, it is not repeated here.

Optionally, the computer program product can be applied to the terminal device in the implementations of this application, and the computer program instructions cause the computer to perform the corresponding process implemented by the mobile terminal device/the terminal device in each method of the implementations of this application. For brevity, I won't repeat it here.

The implementations of this application also provide a computer program.

Optionally, the computer program can be applied to the network device in the implementations of this application. When the computer program runs on the computer, the computer is caused to perform the corresponding process implemented by the network device in each method of the implementations of this application. For brevity, I won't repeat it here.

Optionally, the computer program can be applied to the terminal device in the implementations of this application. When the computer program runs on the computer, the computer is caused to perform the corresponding process implemented by the terminal device in each method of the implementations of this application. For brevity, I won't repeat it here.

A person skilled in the art can be aware that the units and algorithm steps of the examples described in the implementations herein can be implemented by electronic hardware, or a combination of computer software and electronic hardware. Whether these functions are implemented by hardware or software depends on the specific application of the technical solution and design constraints.

Professional and technical person can use different methods for each specific application to implement the described functions corresponding to each of the specific application, but this implementation should not be considered beyond the scope of this application.

A person skilled in the art can clearly understand that, for the convenience and conciseness of description, the specific working process of the system, device and unit described above can be referred to the corresponding process in the foregoing method implementations, which will not be repeated here.

In the several implementations provided in this application, it should be understood that the disclosed systems, devices, and methods can be implemented in other ways. For example, the device implementations described above are merely illustrative. For example, the division of the units is only a logical function division, and there may be other divisions in actual implementation. For example, multiple units or components can be combined or integrated into another system, or some features can be ignored or not implemented. Another point, the displayed or discussed mutual coupling or direct coupling or communication connection may be indirect coupling or communication connection through some interfaces, devices or units, and may be in electrical, mechanical or other forms.

The unit described as a separate component may or may not be physically separated. The component displayed as a unit may or may not be a physical unit, that is, it may be located in one place, or it may be distributed to multiple network units. Some or all of the units can be selected based on actual needs to achieve the purpose of the solutions of the implementations.

In addition, each functional unit in each implementation of this application may be integrated in one processing unit, or each unit may exist alone physically, or two or more units may be integrated in one unit.

If the function is implemented in the form of a software functional unit and sold or used as an independent product, it can be stored in a computer readable storage medium. Based on this understanding, the technical solutions of this application essentially, or the part contributing to the prior art, or a part of the technical solutions may be implemented in a form of a software product. The computer software product is stored in a storage medium, and includes several instructions to enable a computer device (which can be a personal computer, a server, a network device, or the like.) perform all or some of the steps of the methods described in the various implementations of this application. The foregoing storage media include: a U disk, a mobile hard disk, a read-only memory (ROM), a random access memory (RAM), magnetic disks or optical disks and other media that can store program codes.

The above descriptions are merely specific implementations of this application, but the protection scope of this application is not limited to this. Any changes or replacements which a person skilled in the art can easily think of within the technical scope disclosed in this application should be covered within the protection scope of this application. Therefore, the protection scope of this application shall be subject to the protection scope of the claims.

What is claimed is:

1. A method of information transmission, characterized in that the method comprises:
    receiving, by a terminal device, n sets of downlink channel/signals on downlink resources within a channel occupation time (COT), wherein each set of downlink channel/signals in the n sets of downlink channel/signals comprises at least one downlink channel/signal, and n is a positive integer greater than or equal to 1;
    transmitting, by the terminal device, the uplink information corresponding to the i-th set of downlink channel/signals in the n sets of downlink channel/signals on the uplink resources within the COT, where i is a positive integer less than or equal to n;
    wherein, the time of transmission of the uplink information corresponding to the i-th set of downlink channel/signals is (T0+A) wherein the (T0+A) is greater than T1, the T0 is the ending time of the i-th set of the downlink channel/signals, the T1 is the ending time of the downlink resources, the A is the processing latency of the downlink channel/signals.

2. The method according to claim 1, wherein i is greater than 1, and the starting time of transmission of the uplink information corresponding to the i-th set of downlink channel/signals is determined based on the ending time T0 of the i-th set of downlink channel/signals, the ending time T1 of the downlink resource, the ending time of the uplink information corresponding to the (i−1)th set of downlink channel/signals, and the processing latency.

3. The method according to claim 1, wherein the (T0+A) is greater than (T1+G), the (T0+A) is the time of the uplink information corresponding to the i-th set of the downlink channel/signals, and the G is the interval between the downlink resource and the uplink resource.

4. The method according to claim 1, wherein if the starting time of transmission of the uplink information corresponding to the i-th set of downlink channel/signals is greater than the starting time of the uplink resource or the ending time of transmission of the uplink information corresponding to the (i−1)th set of downlink channel/signals, the method further comprises:
    the terminal device sending a specific uplink channel/signal between the starting time of the uplink resource and the starting time of transmission of the uplink information corresponding to the i-th set of downlink channel/signals, or
    the terminal device sending a specific uplink between the ending time of transmission of the uplink information corresponding to the (i−1)th set of downlink channel/signals and the starting time of transmission of the uplink information corresponding to the i-th set of downlink channel/signals;
    wherein, the specific uplink channel/signal comprises at least one of the following information: information for occupying a seat, a sounding reference signal (SRS), a physical uplink shared channel (PUSCH), and a demodulation reference signal (DMRS).

5. The method according to claim 1, wherein the uplink information corresponding to a set of downlink channel/signals in the n sets of downlink channel/signals is transmitted through the same uplink channel.

6. The method according to claim 1, wherein the downlink channel in the i-th set of downlink channels is a physical downlink shared channel (PDSCH), and the uplink information corresponding to the i-th set of downlink channels is feedback response information.

7. The method according to claim 1, wherein the ending time of the uplink information corresponding to the i-th set of downlink channel/signals is a network configuration or a protocol agreement.

8. A method of information transmission, characterized in that it comprises:
    sending, by the network device, n sets of downlink channel/signals to the terminal device on downlink resources within a channel occupation time (COT), wherein each set of downlink channel/signals in the n sets of downlink channel/signals comprises at least one downlink channel/signal, n is a positive integer greater than or equal to 1;
    receiving, by the network device, the uplink information corresponding to the i-th set of downlink channel/ signals in the n sets of downlink channel/signals on the uplink resources within the COT, where i is a positive integer less than or equal to n;

wherein, the time for receiving the uplink information corresponding to the i-th set of downlink channel/signals is (T0+A) wherein the (T0+A) is greater than T1, the T0 is the ending time of the i-th set of the downlink channel/signals, the T1 is the ending time of the downlink resources, the A is the processing latency of the downlink channel/signals.

9. The method according to claim 8, wherein i is greater than 1, and the starting time for receiving the uplink information corresponding to the i-th set of downlink channel/signals is determined according the ending time T0 of the i-th set of downlink channel/signals, the ending time T1 of the downlink resource, the ending time of the uplink information corresponding to the (i−1)th set of downlink channel/signals, and the processing latency.

10. The method according to claim 8, wherein the (T0+A) is greater than (T1+G), the (T0+A) is the time of the uplink information corresponding to the i-th set of the downlink channel/signals, and the G is the interval between the downlink resource and the uplink resource.

11. The method according to claim 8, wherein the uplink information corresponding to a set of downlink channel/signals in the n sets of downlink channel/signals is transmitted through the same uplink channel.

12. The method according to claim 8, wherein the downlink channel in the i-th set of downlink channels is a physical downlink shared channel (PDSCH), and the uplink information corresponding to the i-th set of downlink channels is feedback response information.

13. The method according to claim 8, wherein the ending time of the uplink information corresponding to the i-th set of downlink channel/signals is a network configuration or a protocol agreement.

14. A terminal device, comprising: a processor and a memory, the memory is configured to store a computer program, the processor is configured to invoke and run the computer program stored in the memory, and perform a method, the method comprising:

receiving, by a terminal device, n sets of downlink channel/signals on downlink resources within a channel occupation time (COT), wherein each set of downlink channel/signals in the n sets of downlink channel/signals comprises at least one downlink channel/signal, and n is a positive integer greater than or equal to 1;

transmitting, by the terminal device, the uplink information corresponding to the i-th set of downlink channel/signals in the n sets of downlink channel/signals on the uplink resources within the COT, where i is a positive integer less than or equal to n;

wherein, the time of transmission of the uplink information corresponding to the i-th set of downlink channel/signals is (T0+A) wherein the (T0+A) is greater than T1, the T0 is the ending time of the i-th set of the downlink channel/signals, the T1 is the ending time of the downlink resources, the A is the processing latency of the downlink channel/signals.

15. The terminal device according to claim 14, wherein i is greater than 1, and the starting time of transmission of the uplink information corresponding to the i-th set of downlink channel/signals is determined based on the ending time T0 of the i-th set of downlink channel/signals, the ending time T1 of the downlink resource, the ending time of the uplink information corresponding to the (i−1)th set of downlink channel/signals, and the processing latency.

16. The terminal device according to claim 14, wherein the (T0+A) is greater than (T1+G), the (T0+A) is the time of the uplink information corresponding to the i-th set of the downlink channel/signals, and the G is the interval between the downlink resource and the uplink resource.

17. The terminal device according to claim 14, wherein if the starting time of transmission of the uplink information corresponding to the i-th set of downlink channel/signals is greater than the starting time of the uplink resource or the ending time of transmission of the uplink information corresponding to the (i−1)th set of downlink channel/signals, the method further comprises:

the terminal device sending a specific uplink channel/signal between the starting time of the uplink resource and the starting time of transmission of the uplink information corresponding to the i-th set of downlink channel/signals, or the terminal device sending a specific uplink between the ending time of transmission of the uplink information corresponding to the (i−1)th set of downlink channel/signals and the starting time of transmission of the uplink information corresponding to the i-th set of downlink channel/signals;

wherein, the specific uplink channel/signal comprises at least one of the following information: information for occupying a seat, a sounding reference signal (SRS), a physical uplink shared channel (PUSCH), and a demodulation reference signal (DMRS).

18. The terminal device according to claim 14, wherein the uplink information corresponding to a set of downlink channel/signals in the n sets of downlink channel/signals is transmitted through the same uplink channel.

19. The terminal device according to claim 14, wherein the downlink channel in the i-th set of downlink channels is a physical downlink shared channel (PDSCH), and the uplink information corresponding to the i-th set of downlink channels is feedback response information.

20. The terminal device according to claim 14, wherein the ending time of the uplink information corresponding to the i-th set of downlink channel/signals is a network configuration or a protocol agreement.

* * * * *